Figure 1:
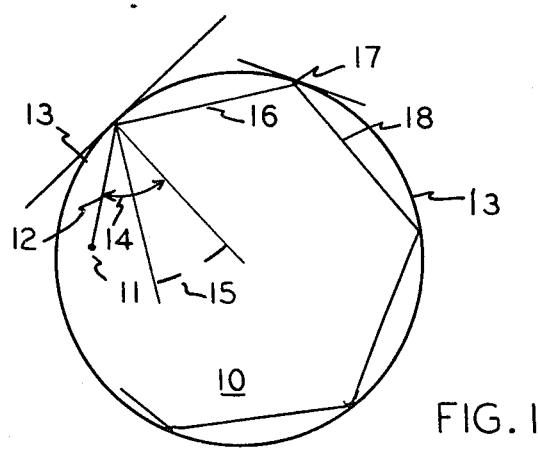

April 21, 1970     V. O. NICOLAI     3,508,165

CLADDINGS FOR LASERS

Filed Nov. 17, 1965

INVENTOR

VAN O. NICOLAI

BY

*Richard J. Miller*

ATTORNEY

United States Patent Office 3,508,165
Patented Apr. 21, 1970

3,508,165
CLADDINGS FOR LASERS
Van O. Nicolai, 1200 S. Courthouse Road,
Arlington, Va. 22204
Filed Nov. 17, 1965, Ser. No. 508,397
Int. Cl. H01s 3/05, 3/06, 3/16
U.S. Cl. 331—94.5          2 Claims This invention relates to an improved laser rod and more specifically to a rod having a particular cladding.

The uses for laser rods has continued to expand and many additional requirements as to operation have been placed upon these devices. One problem that has continued to plague the users of such devices is the off-axis "depumping" action which occurs in a laser rod due to spontaneous off-axis emission of radiation, as opposed to the desired on-axis depumping by stimulated emission of radiation. Whenever a laser rod is pumped there is always a small amount of spontaneous radiation taking place in which electrons fall from an excited state to a ground state giving off photons of energy. Such emission if directed in certain directions may cause depumping due to the "whispering mode" of operation which is a mode of propagation wherein a wave front is totally internally reflected several times along a path within the rod.

It is therefore an object of this invention to provide an improved laser rod having a reduced loss due to "whispering modes" of propagation.

It is a further object of this invention to provide an improved laser rod having a cladding material which is transparent to the light frequencies at the pumping band, and which is absorbent to the light frequencies of the desired emitted bands.

It is yet a further object of this invention to provide an improved laser rod comprising; a core consisting of a first host material and a first dopant material, and means, cladding the core material consisting of a second host material and a second dopant material; wherein the first and second host materials have the same chemical composition and the dopant materials have different chemical compositions.

Yet another advantage of this invention is to provide a method of cladding a laser rod with a cladding material of the same chemical composition and a different dopant material than the rod comprising the steps of placing a seed crystal in the proper environment of temperature and pressure and passing over it the proper admixture of gases to grow a laser rod, changing the admixture of gases to include an element which is transparent at the laser pumping frequency and opaque at the stimulated radiation frequency.

Still another object of the invention is to provide an improved laser rod comprising a core portion consisting of lanthanum aluminate doped with chromium and a cladding material surrounding the rod consisting of lanthanaum aluminate doped with thulium.

Figure 2:
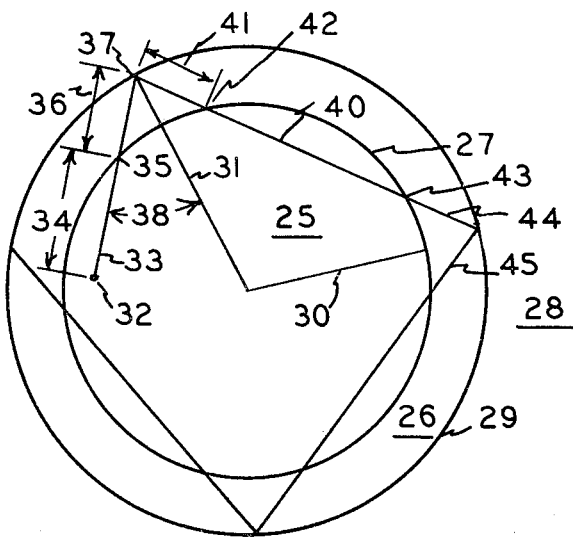

Other objects, advantages and novel features of the invention will become apparent from the following detailed description of the invention when considered in conjunction with the accompanying drawings wherein:

FIGURE 1 is a cross-sectional view of a cylindrical laser rod along a plane normal to the longitudinal axis; and FIGURE 2 is a cross-sectional view of a laser rod normal to the longitudinal axis incorporating one embodiment of the invention.

In FIGURE 1, wherein is shown a cross-sectional view of a laser rod 10, which has been pumped by a source not shown and energy is stored therein. It is assumed that the device has not yet been "triggered" or emitting radiation by stimulated emission. Electron 11 may spontaneously return to the ground state and emit a photon along the line 12. Such a photon will continue along this line and may be amplified and will intercept the outer surface or interface 13 of the rod 10 at the angle 14. This is called the angle of incidence. According to Snell's law, which relates to the relative magnitudes or angles of incidence and refraction at the interface of two materials with differing refractive indices, $$n \sin i = n' \sin r$$

if in this case the rod were ruby, then $n$=refractive index of ruby which is about 1.76; and $n'$=the refractive index of air or about 1.0; and where $i$=the angle of incidence in ruby. If $r$=90 degrees (the refracted beam travels along the interface between the ruby and the air) then:

$$(1.76)(\sin i) = 1.0(1.0)$$

$$\sin i = \frac{1.0}{1.76} = 0.568$$

$$\text{and } i = 3.47°$$

This particular value of $i$ is defined as the critical angle of a ruby-air interface. In FIGURE 1, when the incident angle 14 is less than the critical angle 15, most of the intensity of a photon beam will pass through the interface 13 and only a small fraction, less than approximately 7 percent will be internally reflected. Even if such a reflected beam is subject to intensity amplication, it will cause only minor depumping of the rod compared with the depumping which occurs if angle 14 is more than the critical angle 15, and the photon beam is totally internally reflected. In such an instance the beam will be reflected along a line 16, at an angle 17 which is equal to angle 14.

As the photon travels along the path 16 it is again amplified and will intercept the interface 13 between air and the rod again at the point 17. It is totally internally reflected along line 18 to the interface 13 and will continue along the path. If the amplification along the path is greater than the loss then the wave will continue to strengthen in propagation and will seriously depump the ruby. This is called the whispering mode of operation which has the undesired effect of reducing the stored energy in the rod.

FIGURE 2 a cross-sectional view normal to the longitudinal axis of a laser rod incorporating one embodiment of the invention shows a rod 25 surrounded by a cladding material 26 having specific absorbent properties as hereinafter explained. Between the first host material, or rod 25, and the cladding material, or second host material 26, is an interface 27, and between the cladding 26 and the surrounding air 28 there is a second interface 29. Rod 25 has a radius 30 and the radius of the rod and the cladding 31. The chemical composition of the first and second host materials is the same.

For the sake of this portion of the description the rod is lanthanum aluminate doped with chromium and the cladding material is lanthanum aluminate doped with thulium. The cladding material is optically transparent at the pump bands for the laser rod but has an absorption band at the laser emitting frequency.

Assume that an electron 32 returns from the excited state to the ground state and emits a photon in a direction along line 33. This photon will travel a distance 34 within the rod 25 and will be amplified until it reaches interface 27 at point 35. Since the host material in the rod 25 and the cladding 26 are identical the index of refraction is substantially the same and there is no substantial internal reflection from interface 35. The photon beam will continue to travel in the direction along line 33 in the cladding material a distance 36. It then encounters interface 29 at point 37, and it is totally internally reflected since the angle 38 is greater than the critical angle at which the photon would pass through the interface into the air.

The photon is then reflected along the path 40, the first portion of which 41 is in the cladding material until it reaches the point 42 on interface 27. At this time the photon passes back through the rod until it reaches the point 43 on interface 27. During that period of travel it may be amplified and then while it travels along the path 44 and 45, in the cladding material, it is partially absorbed. It can be seen from the description that the spontaneous emission in the rod may not depump the rod in any degree like that as shown in FIGURE 1 since the wave front produced by such spontaneous emission is seriously reduced, if not totally absorbed, in the cladding material.

It is obvious that by increasing the thickness of the cladding material that is increasing the radius 31 while holding radius 30 constant the path of the spontaneously emitted wave within the cladding can become great enough so that it is totally absorbed.

It is apparent to one skilled in the laser art that this doped cladding technique can also be successfully utilized to reduce the effects of spontaneous emission in other off-axis directions than the radial case just described.

Of particular advantage in producing a laser rod clad in a manner set forth in the application is a vapor disposition technique. A seed crystal is subjected to the proper condition of temperature and pressure and over it is passed an admixture of gases containing the host material and dopant material to produce the laser rod. At such time as the rod is of sufficient size the admixture of gases is changed to deposit upon the rod the cladding layer containing the impurity dopant which is capable of making the clad portion transparent to the pump band frequencies and opaque to the frequency of stimulated emission.

Obviously, many modifications and variations of the present invention are possible in the light of the above teachings. It is therefore to be understood that within the scope of the appended claims the invention may be practiced otherwise than as specifically described.

I claim:
1. An improved laser rod, comprising:
   (a) a core material consisting of a first host material and a first dopant material, said core material pumpable at a first optical wavelength to emit radiation at a second wavelength; and
   (b) means, including a layer about said core material consisting of a second host material and a second dopant material wherein said first and second host materials are lanthanum aluminate and said first dopant is chromium, and said second dopant is thulinum, said cladding layer is transparent at the first optical wavelength and opaque at said second wavelength, and the index of refraction in the core material is substantial equal to that of the cladding layer.
2. The device of claim 1 wherein said first host material is uniformly disposed along an axis and said second host material is uniformly disposed along said first host material.

References Cited

UNITED STATES PATENTS 3,356,966  12/1967  Miller _____ 331—94.5

RONALD L. WIBERT, Primary Examiner

U.S. Cl. X.R.

23—301; 350—96